B. B. NEUTEBOOM.
MOTOR SUSPENSION.
APPLICATION FILED AUG. 19, 1918.

1,390,154.

Patented Sept. 6, 1921.

Inventor
Boudewijn B. Neuteboom,
By Hull, Smith, Brock & West
Attys.

UNITED STATES PATENT OFFICE.

BOUDEWIJN B. NEUTEBOOM, OF DETROIT, MICHIGAN, ASSIGNOR TO THE MILITOR CORPORATION, OF NEW YORK, N. Y., A CORPORATION OF NEW YORK.

MOTOR SUSPENSION.

1,390,154.  Specification of Letters Patent.  Patented Sept. 6, 1921.

Application filed August 19, 1918. Serial No. 250,441.

*To all whom it may concern:*

Be it known that I, BOUDEWIJN B. NEUTEBOOM, a subject of the Queen of the Netherlands, residing at Detroit, in the county of Wayne and State of Michigan, have invented a certain new and useful Improvement in Motor Suspensions, of which the following is a full, clear, and exact description, reference being had to the accompanying drawings.

This invention relates to motor suspension of the class incorporated in motor vehicles; and it has for its general object to provide an arrangement which facilitates the installation of the motor by allowing for slight variations in the location of the suspension elements through which the motor is connected to the frame; and as further objects, the provision of a comparatively simple contrivance through which the motor is connected to the frame or chassis of the vehicle in such a way as to permit the parts to yield readily to the changing relation between the frame and motor without imparting strains to either; and which consists of few parts that are of such nature as to be very convenient of manipulation during assembly, and not liable to dislodgment from jar or vibration.

In carrying out my invention I prefer, at the present time, to follow the three-point suspension arrangement, and I desire to construct the central, forward connection between the motor and frame so that the motor may move bodily slightly fore and aft, so to speak; and to provide the motor structure, adjacent its rear end, with opposed trunnions which are journaled in bearing blocks, the blocks, in turn, being pivoted within brackets secured to the side members of the frame or chassis. By reason of such a suspension, the frame or chassis is permitted to twist and yield with perfect freedom and without imparting strains or stresses to the motor structure, such distortion of the frame being common in motor vehicles as is well known; and because of the sliding connection between the forward end of the motor structure and frame, precise location of the side connections is made unnecessary, thus expediting manufacture.

Figure 1:
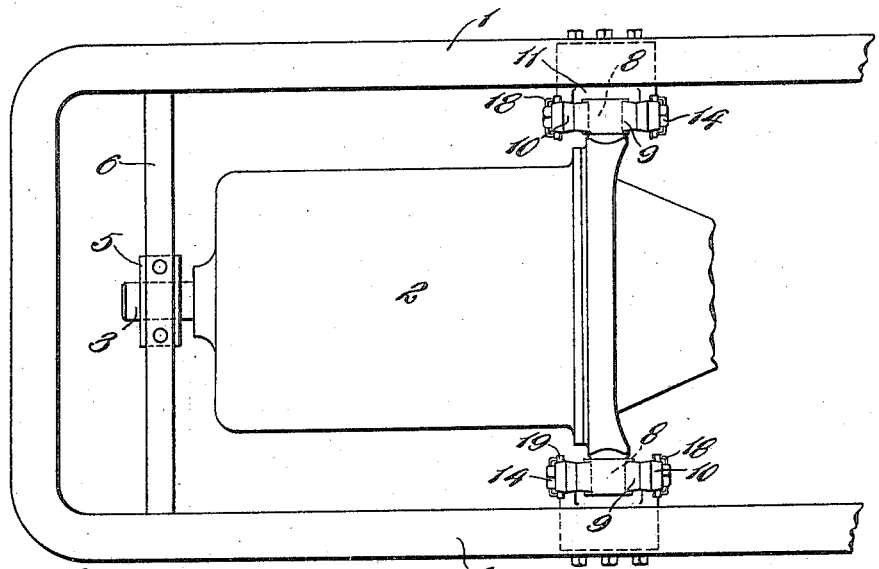
Figure 2:
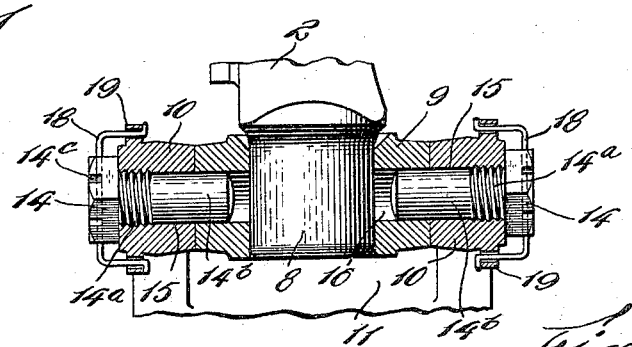
Figure 3:
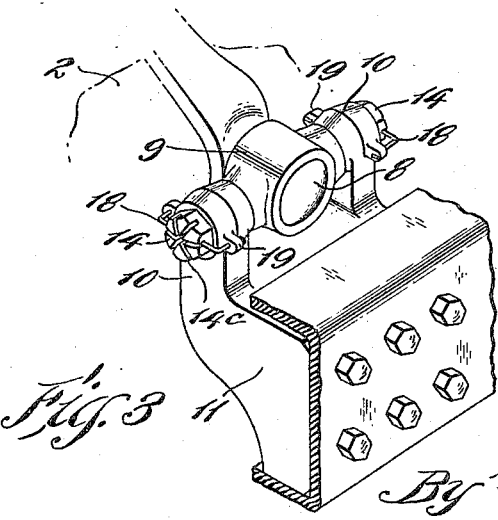

Such an embodiment as that immediately above described is illustrated conventionally in the accompanying drawing wherein Figure 1 is a plan view of the forward end of a vehicle chassis or frame within which a motor is suspended in accordance with my invention; Fig. 2 is a horizontal sectional detail of the connection; and Fig. 3 is a perspective view of the connection between one side of the motor and the adjacent side member of the frame.

The frame or chassis is designated 1, and the motor structure 2. At its forward end the motor casing is provided with a cylindrical extension 3, which may constitute an elongation of the motor shaft bearing and which is rotatably and slidably mounted within a suitable bearing, designated 5, that is carried by a beam 6 extending from one side member of the frame to the other.

Cylindrical trunnions 8 project from the opposite sides of the motor structure adjacent its rear end and are journaled within similarly shaped bores of bearing blocks 9. The bearing blocks fit between the opposed branches 10 of brackets 11 which are secured to the side members of the frame. Screws 14, having short threaded portions 14$^a$ and comparatively long smooth bearing portions 14$^b$, are screwed into the outer threaded ends of the bore 15 of the branches 10 while the bearing portions of the screws occupy the remainder of the bores 15 and project a substantial distance into the bores 16 of the blocks 9, thereby providing supports whereon the blocks may freely oscillate. To hold the screws 14 against turning, I employ wire clips 18 whose central portions are engaged within one of the cross grooves 14$^c$ of the screw heads and which have their ends directed inward through apertures in the ears 19 that project from the opposite sides of the branches 10. Therefore, notwithstanding the shortness of the threaded portions 14$^a$ (which leave ample bearing portions within the bore, of the branches 10 and block 9) the screws 14 are securely held against dislodgment.

Thus it will be seen that my invention provides a cheap and very simple connection between the motor and frame, yet one which is highly effective and which is very convenient of assembling. In installing a motor, the bearing blocks 9 are applied to the trunnions 8 and the motor is located properly within the frame with the blocks 9 between the branches of the forked brackets 11. Thereafter the screws 14 are inserted for holding the parts together and are locked by the clips 18. The connection provided by my invention is very strong and durable, and one not likely to get out of order.

Having thus described my invention, what I claim is:—

1. Means designed to yieldingly connect two elements, one consisting of a motor structure and the other a vehicle frame and comprising a bearing block having a transverse cylindrical bore within which is journaled a correspondingly shaped projection of one of said elements, said block having cylindrical recesses in its ends, and a member carried by the other element and having opposed branches between which the bearing block fits, and means extending through the branches into the recesses of the bearing block thereby to support it for oscillation on an axis substantially at right angles to that of the projection.

2. Means designed to yieldingly connect two elements, one a motor structure, and the other a vehicle frame and comprising a bearing block having a transverse bore within which is journaled a projection of one of said elements, said block having cylindrical recesses in its ends, and a member carried by the other element and having opposed branches between which the bearing block fits, and screws threaded into said branches and having smooth cylindrical ends projecting therethrough and into the recesses of the bearing block.

3. The combination with a motor structure having opposed trunnions, and a vehicle frame wherein said structure is supported, of a bearing block journaled on each trunnion, and a member carried by the frame adjacent each trunnion and to which the corresponding bearing block is pivoted on an axis at substantially right angles to and bisecting the axis of the trunnion.

4. The combination with a motor structure having opposed trunnions, and a vehicle frame wherein said structure is supported, of a bearing block journaled on each trunnion, and a forked member carried by the frame adjacent each trunnion and between the branches whereof the corresponding bearing block is pivotally supported for oscillation on an axis substantially at right angles to the axis of the trunnion.

5. Means designed to yieldingly connect two elements, one a motor structure and the other a vehicle frame and comprising a bearing block having a transverse bore within which is journaled a projection of one of said elements, said block having cylindrical recesses in its ends, and a member carried by the other element and having opposed branches between which the bearing block fits, the branches having bores threaded for a portion of their lengths and registering with the recesses of the block, and screws threaded within the threaded portions of the bores and having smooth portions occupying the remainder of said bores and projecting into the recesses of the block.

6. Means designed to yieldingly connect two elements, one a motor structure and the other a vehicle frame and comprising a bearing block having a transverse bore within which is journaled a projection of one of said elements, said block having cylindrical recesses in its ends, and a member carried by the other element and having opposed branches between which the bearing block fits, the branches having bores threaded for a portion of their lengths and registering with the recesses of the block, screws threaded within the threaded portions of the bores and having smooth portions occupying the remainder of said bores and projecting into the recesses of the block, and means holding the screws against turning.

In testimony whereof, I hereunto affix my signature.

BOUDEWIJN B. NEUTEBOOM.